United States Patent [19]

Burke et al.

[11] 4,220,827
[45] Sep. 2, 1980

[54] TELEPHONE SIGNALING CIRCUIT

[75] Inventors: Edmund T. Burke, West Long Branch; David F. Jones, Middletown, both of N.J.

[73] Assignee: Bell Telephone Laboratories, Murray Hill, N.J.

[21] Appl. No.: 13,566

[22] Filed: Feb. 21, 1979

[51] Int. Cl.² ............................................. H04Q 5/18
[52] U.S. Cl. .......................... 179/99 LS; 179/99 LC; 179/81 C; 179/84 L
[58] Field of Search ...................... 179/99, 81 C, 84 L

[56] References Cited

U.S. PATENT DOCUMENTS

| | | | |
|---|---|---|---|
| 3,322,903 | 5/1967 | Chapin | 179/84 C |
| 3,374,317 | 3/1968 | Chapin | 179/84 L |
| 3,436,488 | 4/1969 | Barbato et al. | 179/99 |
| 3,453,396 | 7/1969 | Lacey et al. | 179/99 |
| 3,567,867 | 3/1971 | Rice et al. | 179/84 L |
| 3,739,104 | 6/1973 | O'Neill | 179/81 C |
| 3,743,792 | 7/1973 | Duft et al. | 179/84 L |
| 3,920,902 | 11/1975 | Matsuo et al. | 179/99 |
| 4,024,353 | 5/1977 | Huikata | 179/99 |
| 4,046,972 | 9/1977 | Huizinga et al. | 179/99 |
| 4,060,700 | 11/1977 | Magnuson | 179/28 |
| 4,081,625 | 3/1978 | Hamatani et al. | 179/99 |
| 4,088,846 | 5/1978 | McEowen | 179/99 |
| 4,125,749 | 11/1978 | Kinoshita et al. | 179/99 |

*Primary Examiner*—Gerald Brigance
*Attorney, Agent, or Firm*—John A. Caccuro; David H. Tannenbaum

[57] ABSTRACT

A telephone signaling interface (I1) enables compatible communications between a modified telephone station set (S1) and a key telephone system (KTS1). Separate alternating voltage control signals from the key telephone system (KTS1) are amplitude and polarity modulated and combined by the interface (I1) to provide ringing, switchhook supervision and visual signaling to station set (S1) over a single signaling wire pair (C1). Current flow on the signaling pair (C1) in one direction provides visual signaling while distinguishable amounts of current flow in the opposite direction provide the supervision and ringing signals. Interruption of the supervision current is converted by interface (I1) into an A lead supervision signal for the key telephone system (KTS1). Voice communication between the modified station set (S1) and the key telephone system (KTS1) occurs over a separate voice communication pair (V1).

20 Claims, 3 Drawing Figures

TELEPHONE SIGNALING CIRCUIT

TECHNICAL FIELD

This invention relates to key telephone systems and, more particularly, to circuitry for interfacing non-key telephone sets to key telephone systems.

BACKGROUND OF THE INVENTION

Key telephone systems have become popular in the past ten years, primarily in business or quasi business environments where the telephone user desires a number of special services in conjunction with the telephone system. One such service is the ability to use a single telephone instrument for a number of different telephone lines. This is accomplished by equipping the telephone instrument with a number of keys (switches) each capable of selecting a particular line. One of the keys is associated with the hold functiion and serves to establish the hold function with respect to an active line. The key telephone instrument is also arranged with lamps associated with each key so that the user may visually determine the status of any given line. Thus, a slow flashing lamp indicates the ringing mode, a steady lamp indicates the off-hook busy mode while a distinctive (fast) flashing lamp indicates the active noncommunicating (hold) mode.

It has been found that in some situations, such as hotel-motel applications, it is necessary to provide these same services to customers who are not equipped with key telephone instruments but who rather have single line telephones of the type commonly found in residential telephone installations. It has also been found that often it is necessary to use the control circuits (key telephone units) of key telephone systems (KTS) with both key and non-key station instruments. In such designs it is desirable to connect the non-key telephone sets to the KTS in the same manner that the key telephone sets are connected to the KTS. Key telephone sets are connected to a KTS via line circuits, usually requiring one line circuit per central office line.

Typical of the line circuits used in such an application is disclosed in R. E. Barbato et al, U.S. Pat. No. 3,436,488 issued on Apr. 1, 1969. These line circuits provide on a line basis a tip and ring pair for voice communications, a lamp pair for visual indications, an A lead pair for supervision (hold) signaling and a miscellaneous pair. In addition, one ringer or buzzer pair is provided that is common to all the telephone lines. Thus, the connection of a 5-line key telephone set to the line circuits requires a 25-pair cable and the connection of a single line key telephone requires a 5-pair cable.

While it is desirable from a voice quality standpoint to separate voice communications from the supervision, ringing and visual signaling it is also desirable to minimize the number of wire pairs required to connect a single line (non-key) station set to a KTS. To separate voice and signaling the connection of a single line station set to a KTS would require at least two pairs, one pair for voice only communications and a second pair for signaling. Since modern KTS and line circuits require multiple wire pairs to carry the various control signals an interface is required to convert the multiple pair signaling to a single signaling pair required for connection to a single line station set.

In one prior art arrangement a single line station set is arranged to provide ringing, supervision and visual signaling functions over 3 wires. A tip and ring pair is used for voice communications, visual indications and supervision while ringing is provided between a third wire and either the tip or ring lead. Such an arrangement, however, does not advantageously separate the voice communications from the telephone signaling.

In U.S. Pat. No. 3,453,396 issued on July 1, 1969 to J. C. Lacey et al, voice communications and ringing are provided on a tip and ring pair with supervision and visual indications being provided by a second pair. In Lacey the pickup key of a key telephone is used to provide a lamp current reversal for A lead signaling. The Lacey patent, however, does not provide for isolation of voice communications from the switchhook supervision, ringing and visual signaling.

In U.S. Pat. No. 4,046,972 issued on Sept. 6, 1977 to D. D. Huizinga et al an electronic key telephone station set is described which communicates with a telephone controller using a data transmit pair and a data receive pair for data communications in addition to a tip and ring for voice communications. In Huizinga, digital data signals representative of the switchhook supervision, ringing, visual and other signals are sent over the data transmit and data receive pairs. Digital multiplex data signaling is utilized in Huizinga which enables multiple telephone line signaling over the data transmit and data receive pairs.

In applications involving existing telephone controllers, it may be desirable to utilize the signaling voltages available at the telephone controller to provide the switchhook supervision, ringing and visual signaling for telephone operation. In these applications a telephone signaling circuit is required which utilizes the available signaling voltages from the telephone controller, to provide a switchhook supervision, ringing and visual signaling to a telephone station set over a single signaling pair.

Thus, it is a problem to design a signaling interface arrangement for telephone station sets which is compatible with existing signaling voltages at key telephone systems (KTS) and which enables communication of ringing, supervision and visual signaling over a single wire pair.

DISCLOSURE OF THE INVENTION

The above-discussed problems are solved by the disclosed telephone signaling interface arranged between a key telephone system (KTS) and a modified telephone station set. A signaling pair carries ringing, supervision and visual indication signals between the interface and the modified station set. A communication pair from the modified station set connects directly to the KTS and carries only voice communications. The interface circuit receives separate ringing and visual signals from the KTS and transmits a separate switchhook supervision signal to the KTS.

The interface circuit amplitude and polarity modulates the existing signaling voltages from the KTS and provides a combined signaling voltage for transmission over the signaling pair to the telephone station set. This combined signaling voltage is utilized at the telephone station set to control and power the visual and audible devices as well as to provide switchhook supervision. The interface is arranged such that it can share a line circuit of a KTS with an existing key telephone station set and interact compatibly with the existing signal.

A telephone station set for connecting to the telephone signaling interface is disclosed in our copending patent application E. T. Burke-D. F. Jones, Ser. No. 013,567 filed concurrently herewith and incorporated by reference herein. The station set is arranged to decode the modified alternating voltage signal and to provide audible and visual indications in response to this signal. The switchhook supervision or on-hook, off-hook status of the station set is determined by having the interface circuit monitor the current flowing over the signaling pair to the station set. The interface adapts this supervision signal into an A lead control signal which is provided to the KTS.

A visual indicating device in the modified station set is arranged to illuminate only in response to a first direction of current flow over the signaling pair. A buzzer in the station set is arranged in series with a diode and rings only in response to a current flow opposite in direction to the first abovementioned current flow. A break contact of the switchhook is arranged in series with the buzzer to extinguish the ringing when the station set goes off hook. Supervision signals are encoded as an interruption of the current flow through the buzzer. Supervision in the absence of ringing is provided by a reduced current flow through the buzzer which is not enough to activate the buzzer.

Figure 1:
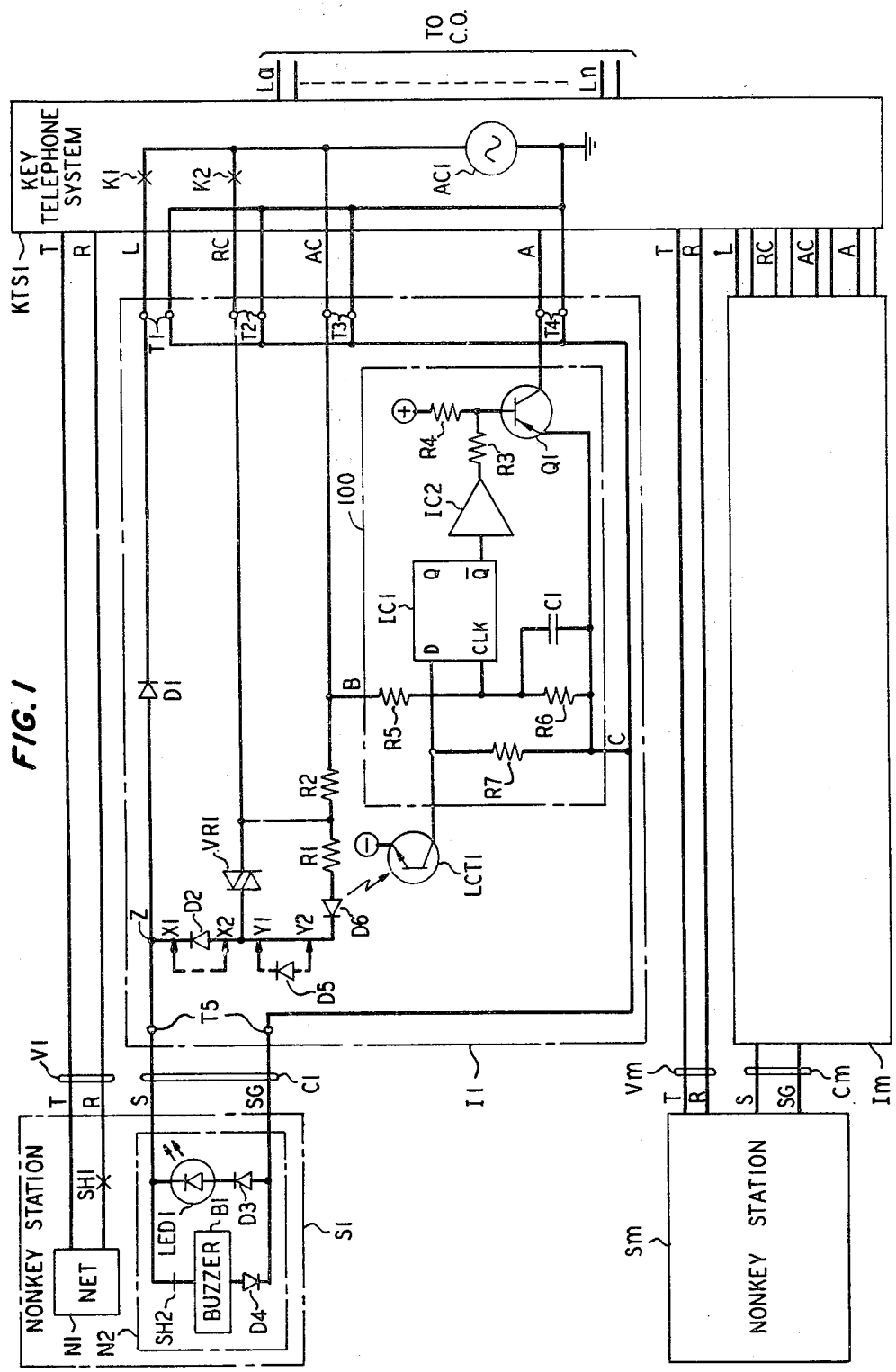
FIG. 1—shows a schematic of the telephone signaling interface circuit as connected to a KTS.

DETAILED DESCRIPTION considering the drawing of FIG. 1, a plurality of lines La to Ln from a central office (CO) connect to key telephone system KTS1. Key telephone system KTS1 is arranged to provide a voice connection between any of the station Sl-Sm and any of the CO lines La-Ln. The particular key telephone system KTS1 shown in FIG. 1 is of the type which transmits only voice signals over the tip and ring (T & R) pair while providing separate wire pairs for the various control signals. Typically, key telephone system KTS1 of FIG. 1 provides a lamp signal on pair L and a buzzer signal on pair RC to the connected key telephone station sets (not shown) and receives a hold status H on pair A from the key telephone station sets. In a hotel-motel application, as shown in FIG. 1, KTS1 will connect to serve non-key station sets Sl-Sm. In such an application a message waiting feature is provided for by using a station set (Sl) which includes a message waiting indicator.

In the hotel-motel application of FIG. 1 each signaling interface circuit (I1-Im) enables the existing controls between KTS1 and each station set (Sl-Sm) to be consolidated onto a single wire pair (Cl-Cm) per station set (Sl-Sm). Such an arrangement enables a connection of a non-key station set (Sl-Sm) to key telephone system KTS1 using only a voice communication pair (Vl-Vm) and a signaling pair (Cl-Cm). In addition, the use of interface (Il-Im) enables the connection of non-key station sets (Sl-Sn) to a system KTS1 designed for key telephone operation with only minimal changes in the system. Thus, key telephone system KTS1 can accommodate either key or non-key station sets, without a change in its hardware.

However, depending on the features to be provided, changes may be required in the timing of control signals of system KTS1. For example, in the hotel-motel application of FIG. 1 a lamp signal on pair L is required for the message waiting feature that is different from the normal lamp signal used in key station set operation. Hence, a change in the control of relay contact K1 of KTS1 is required to modify the lamp signal on pair L. The standardizing of system KTS1 hardware lends itself to a flexible key telephone system which can be adopted to key or non-key telephone operation by the addition of an interface circuit together with changes in the control signals.

The basic operation of the telephone signaling interface circuit shown in FIG. 1 is as follows. An alternating voltage signal on pair L from KTS1 is rectified such that a lamp signal is provided over lead S of signaling pair C1 as a negative half-wave rectified signal. A buzzer signal is provided over lead S by a positive half-wave rectification of the control signal on pair RC. A reduced amount of positive half-wave rectified signal (from lead AC) which is insufficient to operate buzzer B1 is supplied over lead S and is utilized as supervision current, for detecting off-hook call origination signals from station S1.

The non-key station set S1 shown in FIG. 1 contains a standard voice communication network N1 connected through switchhook contact SH1 to the T and R leads of communications pair V1. Illuminating device LED1 is connected in series with diode D3 across leads S and SG of signaling pair C1. In FIG. 1 LED1 is a light-emitting diode. Diode D3 and LED1 conduct on negative half-wave signals (when lead S is negative with respect to lead SG). Diode D3 is used to improve the reverse voltage breakdown characteristics of the series path consisting of diode D3 and diode LED1. A series connection of buzzer B1, diode D4 and break switchhook contact SH2 is also connected across leads S and SG of signaling pair C1. Diode D4 is connected to conduct for positive half-wave signals (when lead S is positive with respect to lead SG). Thus, depending on the polarity of the control signal on pair C1, unidirectional current will flow through either the path containing diode D3 or the path containing diode D4.

Interface I1 provides the control signals to station set S1 over signaling pair C1. Interface I1 exchanges control signals with key telephone system KTS1 over the L, RC, AC and A wire pairs. Lamp signal L from key telephone systems KS1 is generated by switching alternating voltage source AC1 through relay contact K1. Alternating voltage source AC1 supplies approximately 15 volts RMS at 60 Hertz. Lamp signals L is rectified by diode D1 of interface I1 and the resultant negative half-cycle voltage is connected across wires S and SG of wire pair C1. This negative half-cycle voltage will enable unidirectional current conduction by diodes D3 and LED1 in station set S1 resulting in a visual telephone status indication.

A ringing signal on pair RC is generated by switching the alternating voltage from source AC1 through relay contact K2 of KTS1. Interface circuit I1 directs this ringing signal through varistor VR1 in parallel with the series combination of resistor R1 and the diode of light coupled transistor LCT1. The current output from this combination is rectified by diode D2 and the resultant positive half-wave signal is applied across signaling pair C1. When a ringing signal is present, positive half-wave current will flow from pair RC to wire pair C1 of interface circuit I1. This unidirectional current flows over wire pair C1 and through buzzer B1 of station set S1 resulting in an audible buzzing tone. This current flow is also used as a supervision current which is interrupted when the station set S1 goes off-hook. Note, when station set S1 goes off-hook, switchhook break contact SH2 opens and buzzer B1 no longer operates. Thus, contact SH2 provides both supervision and a buzzer control.

At interface circuit I1 during the ringing phase, current division occurs between varistor VR1 path and resistor R1 and diode D6 of LCT1 path. Resistor R1 and diode D6 of LCT1 provide a sensor for detection of supervision current. Varistor VR1 conducts only when the voltage across diode D6 of LCT1 and resistor R1 reaches approximately 1 volt, the threshold voltage of VR1. Thus, during the ringing phase sufficient supervision current flows through diode D6 of LCT1 to saturate the transistor of LCT1. The collector of the transistor of LCT1 connects through resistor R7 to a ground potential and also to the D input of a D flip-flop IC1. The emitter of LCT1 is connected to a −5 volt supply. The D flip-flop is connected for operation between −5 volts and ground. Thus, logic 1 signals are at ground potential and logic 0 signals are at −5 volts.

During the on-hook, non-ringing phase when supervision current is flowing, the D input is at −5 volts due to saturation of the transistor of LCT1. This −5 volt potential on the D lead is clocked by a signal on lead CLK to reset the D flip-flop IC1 (Q is logic 0). If no supervision current is flowing (station S1 off-hook), the collector of transistor LCT1 is not saturated and the resultant collector voltage sets the D flip-flop (Q is logic 1). When supervision current flows, D flip-flop IC1 is reset, lead $\overline{Q}$ is logic 1 and gate IC2 has an output at logic 1. gate IC2 is an "open collector" noninverting integrated circuit gate which is connected for operation between −5 volts and ground. The output of gate IC2 is connected through resistor R3 to resistor R4 and the base of PNP transistor Q1. The other end of resistor R4 connects to +5 volt source. Resistors R3 and R4 provide bias for transistor Q1 such that a ground potential from gate IC2 will result in a positive potential at the base of transistor Q1. Since the emitter of transistor Q1 is at ground potential, a positive potential on its base turns transistor Q1 off. Hence, the collector of transistor Q1 is open and hence lead A is open.

Thus, lead A is open when supervision current is flowing (on-hook condition) through station set S1. The open on lead A is transmitted to key telephone system KTS1 as a supervision signal indicating an on-hook condition of station set S1. When an off-hook condition occurs, supervision current ceases and D flip-flop IC1 is set and hence $\overline{Q}$ output is at −5 volts. The output of gate IC2 is also at −5 volts which biases the base of transistor Q1 negative, thus, turning on transistor Q1. Hence, lead A is grounded through the collector of transistor Q1. The ground on lead A is transmitted to key telephone system KTS1 as a supervision signal indicating an off-hook condition at station set S1.

The clocking signal (lead B) for D flip-flop IC1 is derived from a delayed alternating voltage signal from source AC1 of KTS1. Resistors R5 and R6 form a voltage divider to reduce the magnitude of the alternating voltage. Capacitor C1 together with resistors R5 and R6 provide a delay circuit which enables light coupled transistor LCT1 to respond to signal charges before being clocked into D flip-flop IC1 by the clock signal on lead CLK. Thus, D flip-flop IC1 effectively samples the supervision current during every cycle of the alternating voltage source AC1. Thus, changes in lead A status occur within 17 milliseconds of an off-hook condition at station set S1.

During the silent interval between ringing signals or when the line is idle, no voltage appears on lead RC from KTS1. At this time supervision current is provided from KTS1 over pair AC. This supervision current flows through resistors R2 and R1 and thence through the diode of LCT1 and diode D2 to wire S of signaling pair C1. Resistors R2 and R1 of interface circuit I1 reduce the supervision current flow to a magnitude which will not activate buzzer B1 in station set S1. The value of resistor R1 is chosen so that the current rating of D6 will not be exceeded before the one volt required to activate varistor VR1 is reached. The value of resistor R2 is chosen such that the resultant current flow cannot operate buzzer B1 in station set S1.

The arrangement described in FIG. 1 is useful in hotel-motel systems where a message waiting capability is desirable. In such systems it has become commonplace to have a message waiting lamp on each station set which indicates that a call was received while the guest was out of the room. Usually this lamp is lit when a message comes in and it remains lit until the guest returns and calls the attendant to receive his message.

If it is desirable to give visual ringing indication along with the audible ringing indication interface circuit I1 can be modified to accomplish this feature. In such an arrangement, as shown by designations X1-X2 and Y1-Y2 of FIG. 1, diode D2 would be removed and replaced by the shorting strap (dotted line between X1 and X2) and diode D5 would be inserted in series with resistor R2 (replacing the wire between Y1 and Y2. Thus, when a ringing signal appears on line RC it will not be rectified and the positive half will operate buzzer B1 and the negative half will operate LED1 of station set S1. Line supervision will still utilize the positive half-wave current since diode D5 will rectify the alternating voltage on line AC. Thus, light emitting diode LED1 of station set S1 operates during ringing if no message waiting signal is present. If a message waiting signal is present, diode LED1 will be lit and, hence, the ringing signal does not affect it.

The disclosed invention, although described as part of a hotel-motel system, is not limited to such an application. The invention functions with any key telephone system which utilizes the described signaling characteristics. Thus, the disclosed invention can be connected to a key telephone system arranged only for internal intercom use.

INTERFACE OPERATION WITH LINE CIRCUITS

Figure 2:
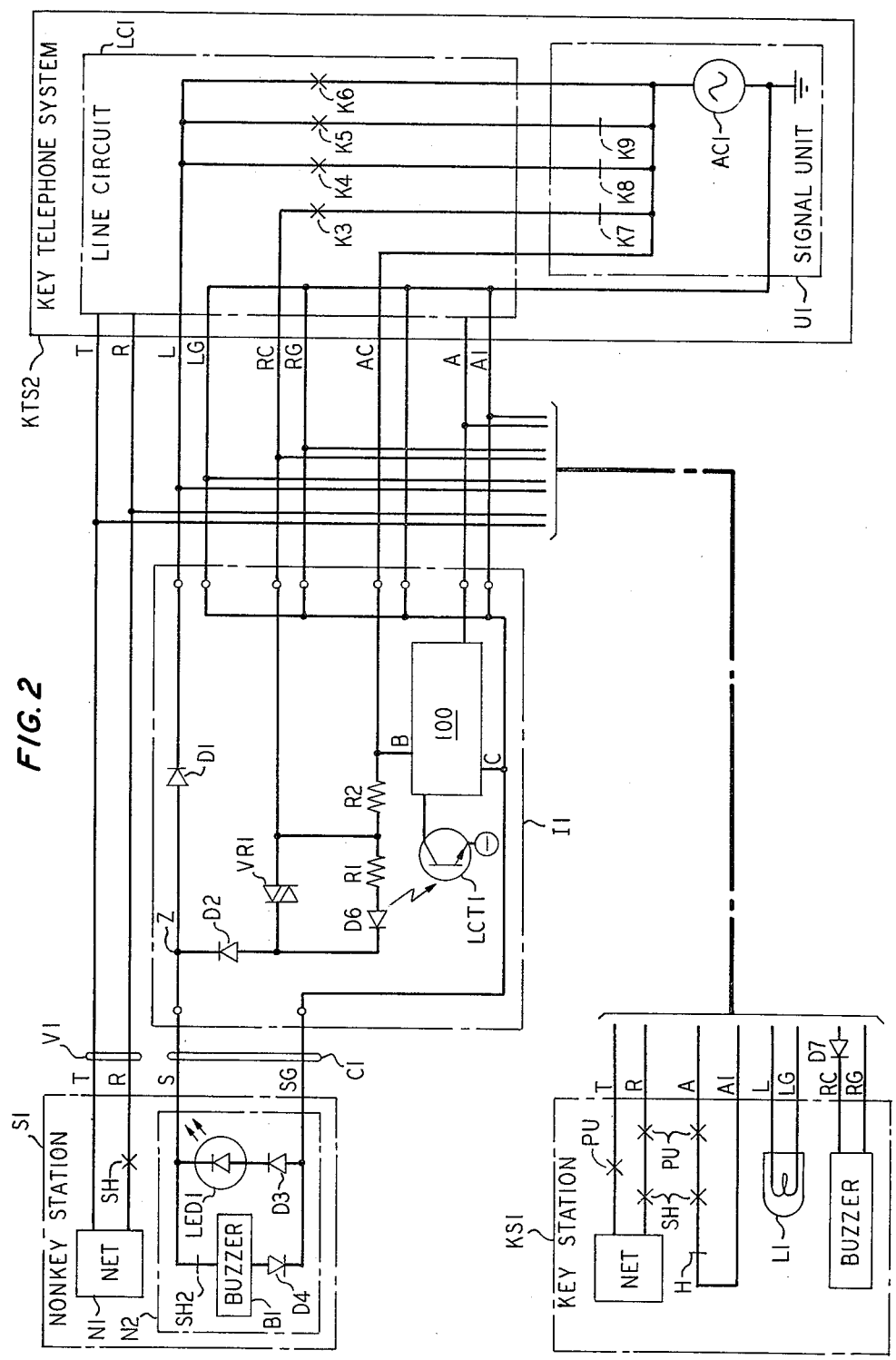
FIG. 2—shows a connection of the telephone signaling interface circuit to a line circuit of a KTS which is shared by a key telephone station set.

As shown in FIG. 2 non-key station set S1 can operate with line circuit LC1 of key telephone system KTS2 by using interface I1. In addition, as shown by FIG. 2, non-key station set S1 can share line circuit LC1 with key station set KS1. Interface circuit I1 converts the signaling characteristics of station set S1 such that it is compatible with key telephone station sets. Line circuit LC1 provides lamp L and ring control RC signals which are derived from a common alternating voltage source AC1 of a signal unit U1 through various relay contacts K3 through K6. Note, the operation of LED1 of station set S1 is identical to the operation of lamp L1 of station set KS1. Line circuit LC1 receives supervision status over lead A from both station sets S1 and KS1.

Operation of key station set KS1 in conjunction with line circuit LC1 is well known, for example, see U.S. Pat. No. 3,436,488, issued on Apr. 1, 1969, to R. E. Barbato, et al. The operation of non-key station set S1 is the same as described in FIG. 1 except that lamp signal L describes the status of the line rather than a message waiting condition. Thus, when a ringing signal occurs on line RC the buzzer at station set S1 and KS1 will operate. The operation of buzzer B1 is the same as that described in FIG. 1. Note, a diode D7 is inserted in the RC lead to the buzzer of station set KS1 to prevent a sneak path of lamp signal L from operating the buzzer. Diode D7 could be physically incorporated as part of interface I1. Typically, a relay contact such as K3 in line circuit LC1 controls the application of the ringing voltage from source AC1 of signal unit U1. Note, contacts K7 and K8 of signal unit U1 operate at the 60 IPM "flashing" rate. Coincidental with the ringing signal, lamp signal on pair L flashes and operates both LED1 at station S1 and lamp L1 at KS1. The operation of LED1 occurs in the same manner as that described in FIG. 1. The lamp signal on pair L is also derived from source AC1 through a standard relay contact arrangement such as contact K4 of line circuit LC1.

When either station at S1 or KS1 go off-hook a ground is communicated to lead A of line circuit LC1. This occurs at interface I1 in the same manner as described in FIG. 1. During off-hook both LED1 at station S1 and lamp L1 at station KS1 will be in a steady "on" condition visually indicating a busy line condition.

If station set KS1 initiates a hold condition, by depressing the hold button, the resulting winking signal on lead L will operate both LED1 of station set S1 and lamp L1 at station set KS1. The winking signal is derived from source AC1 of signal unit U1 through a standard relay contact arrangement such as shown by contact K5 of line circuit LC1. The contact K9 of signal unit U1 operates at the 60 IPM "winking" rate. Note that station set S1 does not have a hold button and hence cannot initiate a hold condition. Station set S1, however, can cancel a hold condition by going off-hook when line V1 is in the hold condition. Inadvertent cancellation of a line on hold is not likely since LED1 is winking during a hold condition, thus giving a visual indication of the line condition.

When both station sets S1 and KS1 return to the on-hook condition, no lamp signal will be present and both LED1 at station set S1 and lamp L1 at station set KS1 are extinguished.

The above arrangement can be used in applications where limited line access is desired at certain telephone locations served by a key telephone system.

In the embodiments described in FIG. 1 and FIG. 2 the signals on the L and RC leads provide the power to operate LED1 and buzzer B1 of the station set S1. Alternately the signals on the L and RC leads could control relays or other switching devices on the interface circuit to switch power from the AC lead to provide the lamp and ringing signals. Hence a line circuit or key telephone system having dc or other control signals on the L and RC leads could operate these control relays on the interface circuit. Additionally, if desirable, a local alternating voltage could be provided on the interface circuit thus eliminating a connection to voltage source AC1 of the key telephone system. Thus by utilizing light coupled transistor technology and a local alternating voltage the L, RC, AC, and A leads of the key telephone system can be electrically isolated from the interface and telephone circuitry.

Figure 3:
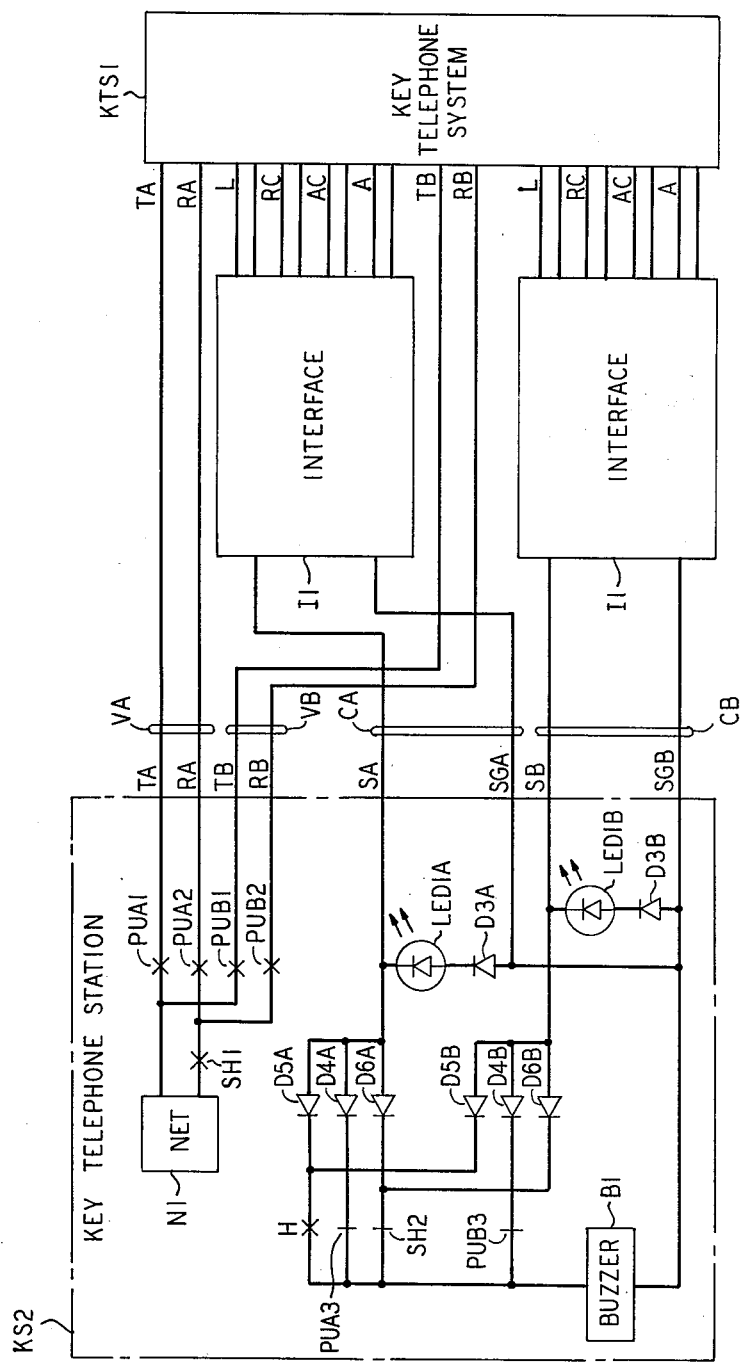
FIG. 3—shows the connection of two telephone signaling interface circuits between a modified key telephone station set and a KTS.

As shown in FIG. 3 a two telephone line key telephone station set (KS2) as described in our previously referenced copending patent application, Ser. No. 013,567, could be connected through two of the disclosed telephone signaling interface circuits (II) to a key telephone system (KTS1). In such an application each signaling pair (CA, CB), associated with a corresponding voice pair (VA, VB) of the key telephone station set KS2, will be connected through an interface circuit (II) to the key telephone system (KTS1). Such an arrangement enables a key telephone system (KTS1) to connect to a key telephone set (KS2) using one voice pair and one signaling pair per telephone line. This reduction in the amount of telephone cabling required to connect a key telephone set (KS2) to a key telephone system (KTS1 results at the expense of adding one interface circuit (I1) and modifying the standard 500 type key telephone set.

Additionally, in applications where the key telephone sets are nearby the key telephone system a common ground return can be utilized. Thus, with reference to FIG. 3 either the SGA or SGB lead can be utilized as the common ground return lead. In such situations N+1 signaling leads are required to provide signaling for a key telephone set having N lines.

Even through the disclosed interface circuit has been described as connecting to a line circuit or to a key telephone system it is to be noted that the interface circuitry can be incorporated into the design of a line circuit or other circuitry of a key telephone system.

In addition, other embodiments of the telephone signaling circuit known to those skilled in the art could provide the same function without deviating from the scope of the disclosed invention.

We claim:

1. A telephone signaling interface circuit (I1) is arranged to interface a telephone station (S1) to a key telephone system (KTS1) using a signaling pair (C1), wherein said key telephone system includes lamp signals which provide visual status of line conditions with respect to an associated "T" and "R" wire pair (V1) under control of said telephone system, said lamp signals being provided over an "L" lead, wherein said key telephone system obtains active and inactive status signals over an "A" lead, wherein said key telephone system provides ringing control signals over an "RC" lead, wherein said key telephone system provides a ringing supply voltage over an "AC" lead, and wherein voice communication between said non-key station and said key telephone system occurs over said "T" and "R" wire pair (V1)

characterized in that said interface circuit (I1) includes means for connecting (T1, T2, T3, T4) to said "L", "RC", "AC", and "A" leads of said key telephone system, means for obtaining a first signal (D1) consisting of a first polarity of voltage from said "L" lead, means for obtaining a second signal (D6) consisting of a first amplitude of a second polarity of voltage from said "AC" lead, means for obtaining a third signal (D2) consisting of a second amplitude of a second polarity of voltage (D2) from said "RC" lead, means for combining (Z) said first, second and third signals into a composite signal, means for communicating (T5) said composite signal over a signaling pair to said telephone station, and means for detecting (100) continuity of current flow of said second and third signals over said signaling pair to said telephone station and converting said detected signal to a supervision signal on said "A" lead.

2. The invention of claim 1 wherein said current detector means (100) includes means for periodically sampling (IC1) current from said second polarity of voltage to provide said supervision signal on said "A" lead.

3. The invention of claim 2 wherein said periodic sampling means (IC1) samples at a rate derived from a key telephone system signal.

4. The invention of claim 3 wherein said periodic sampling means (IC1) includes a bistable device for storing said periodic current samples.

5. The invention of claim 1 wherein said current detector means (100) includes a light coupled transistor (LCT1).

6. In a key telephone system (KTS2) including a key telephone line circuit (LC1) connected to a key telephone station set (KS1), a telephone signaling interface circuit (I1) adapted to connect between said line circuit and said key telephone station set, said interface circuit arranged for interacting with signaling leads (L, RC, A) leading from said line circuit characterized in that said signaling interface circuit (I1) is connected by a signaling pair (C1) to a station set (S1), said signaling interface including means for connecting to the "L", "RC" and "A" leads of said line circuit, means for connecting to an "AC" lead of an alternating voltage ringing supply (AC1) of said key telephone system, first switching means (D1) for obtaining a first polarity of voltage from said "L" lead, second switching means (D6, D2) for obtaining a second polarity of voltage from said "AC" lead, third switching means (D2) for obtaining a second polarity of voltage from said "RC" lead, means for combining (Z) signals from said first, second and third switching means into a composite signal for transmission over said siganling pair to said telephone station, and means for detecting (100) continuity of current flow of said second polarity of voltage over said signaling pair to said telephone station, and for converting said detected signal to a supervision signal on said "A" lead.

7. The invention of claim 6 wherein voltage on said "L" lead is an interrupted alternating voltage lamp signal for providing visual status of line conditions with respect to an associated "T" and "R" wire pair (VI) under control of said line circuit, wherein voltage on said "RC" lead is an interrupted alternating voltage ringing signal, wherein voltage on said "A" lead is a dc voltage indicative of active or inactive status of said associated "T" and "R" wire pair.

8. The invention of claim 6 wherein said current detector means (100) includes means for periodically sampling (IC1) current from said second polarity of voltage to provide said supervision signal on said "A" lead.

9. The invention of claim 8 wherein said periodic sampling means (IC1) samples at a rate derived from a key telephone system signal.

10. The invention of claim 9 wherein said periodic sampling means (IC1) includes a bistable device for storing said periodic current samples.

11. The invention of claim 6 wherein said current detector means (100) includes a light coupled transistor (LCT1).

12. In a key telephone system (KTS2) including a key telephone line circuit (LC1) a telephone signaling interface circuit (I1) connected to said line circuit, said interface circuit arranged for providing signaling between a non-key telephone station set (S1) and said line circuit characterized in that said telephone signaling interface circuit is connected by a signaling pair (C1) to said non-key station set, said non-key station set including a first circuit consisting of an illuminating device (LED1) arranged to provide a visual indication for a unidirectional first current received over said signaling pair;

a second circuit consisting of a series connection of a buzzer (B1), a diode (D4) and a normally closed switchhook contact (SH2), said buzzer arranged to operate when a unidirectional second current exceeding a fixed amplitude and having a direction opposite said unidirectional first current is received over said signaling pair;

said interface circuit including means for connecting to an alternating voltage ringing source (AC) in said key telephone system;

means for connecting to lamp (L), ringing (RC) and supervision (A) signals of said line circuit;

first switching means (D1) arranged to provide a unidirectional first current from said lamp signal over said signaling pair to activate said illuminating device;

a second switching means (D6, D2) arranged to provide a unidirectional second current from said ringing voltage source over said signaling pair in a direction opposite said first current, said second current being of insufficient amplitude to operate said buzzer;

a third switching means (D2) arranged to provide a unidirectional third current from said ringing signal which is opposite said first current, said third current being added to said second current for operating said buzzer over said signaling pair; and current detector means (100) arranged to detect interruptions in said second current flow and in response thereto to provide a supervision signal (A) to said key telephone system.

13. The invention of claim 12 wherein said lamp signal is an interrupted alternating voltage for providing visual status of line conditions with respect to an associated "T" and "R" wire pair under control of said line circuit, wherein said ringing signal is an interrupted alternating voltage signal, wherein said supervision signal is a dc voltage indicative of active or inactive status of said associated "T" and "R" wire pair.

14. The invention of claim 12 wherein said current detector means (100) includes means for periodically sampling (IC1) current from said second polarity of voltage to provide said supervision signal on said "A" lead.

15. The invention of claim 14 wherein said periodic sampling means (IC1) samples at a rate derived from a key telephone system signal.

16. The invention of claim 12 wherein said current detector means (100) includes a light coupled transistor (LCT1).

17. A line circuit for use in a key telephone system, said line circuit adapted for connection between a telephone station and a telephone line from a switching exchange said line circuit being adapted for providing voice communications to said telephone station (S1) over a "T" and "R" wire pair (V1) and control communications to said telephone station over a signaling pair (C1) wherein said control communications include signals for providing audible, visual and switchhook supervision signaling characterized in that
said line circuit includes
means for obtaining a first signal (D1) consisting of a first polarity of voltage for providing said visual signaling,
means for obtaining a second signal (D6, D2) consisting of a first amplitude of second polarity of voltage for providing said audible signaling,
means for obtaining a third signal (D2) consisting of a second amplitude of a second polarity of voltage (D2) for providing said switch supervision signaling,
means for combining (Z) said first, second and third signals into a composite signal,
means for communicating (T5) said composite signal over a signaling pair to said telephone station, and
means for detecting (100) continuity of current flow of said second and third signals over said signaling pair to said telephone station and converting said detected current continuity to a signal indicating active or inactive status of said telephone line.

18. The invention of claim 17 wherein said current detector means (100) includes means for periodically sampling (IC1) current from said second polarity of voltage to provide said supervision signal on said "A" lead.

19. The invention of claim 18 wherein said periodic sampling means (IC1) samples at a rate derived from a key telephone system signal.

20. The invention of claim 17 wherein said current detector means (100) includes a light coupled transistor (LCT1).

* * * * *